US011050766B2

(12) United States Patent
Pedasingu et al.

(10) Patent No.: US 11,050,766 B2
(45) Date of Patent: Jun. 29, 2021

(54) GENERATING UNIQUE VIRTUAL PROCESS IDENTIFIERS FOR USE IN NETWORK SECURITY MECHANISMS

(71) Applicant: EMC IP Holding Company LLC, Hopkinton, MA (US)

(72) Inventors: Vishnu C. Pedasingu, Bangalore (IN); Phaneendra Mouli Ksl, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 164 days.

(21) Appl. No.: 16/176,298

(22) Filed: Oct. 31, 2018

(65) Prior Publication Data

US 2020/0137086 A1    Apr. 30, 2020

(51) Int. Cl.
*H04L 29/06* (2006.01)

(52) U.S. Cl.
CPC .......... *H04L 63/1416* (2013.01); *H04L 63/20* (2013.01)

(58) Field of Classification Search
CPC ... H04L 63/1416; H04L 63/20; G06F 3/0608; G06F 40/205; G06F 16/215; G06F 16/244; G06F 16/1748; G06F 16/2272; G06F 16/2365; G06F 16/2379; G06F 3/0641; G06F 3/0683; G06F 11/1435
See application file for complete search history.

(56) References Cited

U.S. PATENT DOCUMENTS

| 10,073,895 B2 | 9/2018 | Rinke et al. | |
| 2016/0085452 A1* | 3/2016 | Dukes | G06F 3/0608 711/154 |
| 2016/0364450 A1* | 12/2016 | Branson | G06F 16/215 |
| 2017/0213167 A1 | 7/2017 | Rinke et al. | |
| 2018/0268009 A1* | 9/2018 | Desai | G06F 16/2455 |
| 2018/0295145 A1 | 10/2018 | Brow et al. | |
| 2019/0081983 A1* | 3/2019 | Teal | H04L 63/14 |

FOREIGN PATENT DOCUMENTS

CN          110019054 A  *  7/2019  ....... G06F 17/30156

OTHER PUBLICATIONS

RSA, RSA NetWitness Endpoint Data Sheet, Jul. 2017.

* cited by examiner

*Primary Examiner* — Harunur Rashid
(74) *Attorney, Agent, or Firm* — Ryan, Mason & Lewis, LLP

(57) ABSTRACT

Methods, apparatus, and processor-readable storage media for generating unique virtual process identifiers are provided herein. An example computer-implemented method includes generating a virtual process identifier for a process within a given network, wherein the virtual process identifier is based at least in part on multiple items of process-related information; associating the virtual process identifier with one or more types of events to be carried out within the given network in connection with the process; filtering repetitive events from a set of processed events carried out in connection with the process, wherein filtering the repetitive events comprises identifying multiple instances of the virtual process identifier associated with multiple instances of the same type of event; and reporting, to at least one server, the processed events remaining subsequent to the filtering step.

20 Claims, 6 Drawing Sheets

GENERATING UNIQUE VIRTUAL PROCESS IDENTIFIERS FOR USE IN NETWORK SECURITY MECHANISMS

FIELD

The field relates generally to information processing systems, and more particularly to techniques for providing security in such systems.

BACKGROUND

Visibility into endpoint activity is an important aspect of any endpoint detection and response (EDR) solution. Via existing approaches, captured events (such as process, registry, file, network, etc.) happening on an agent machine are posted to a server, and the server performs analysis on the events to trigger indicators of compromise (IoCs) and assigns one or more risk scores. Such events can number into the tens of thousands per day on a single endpoint machine, creating efficiency and scalability issues among the existing approaches. Moreover, many of the captured events are commonly repeated processes and/or operations performed by applications, such as, for example, scheduled scripts, users connecting to a web browser, opening of an email client, etc.

SUMMARY

Illustrative embodiments of the invention provide techniques for generating unique virtual process identifiers (VPIDs). An exemplary computer-implemented method can include generating a virtual process identifier for a process within a given network, wherein the virtual process identifier is based at least in part on multiple items of process-related information, and associating the virtual process identifier with one or more types of events to be carried out within the given network in connection with the process. Such a method can also include filtering repetitive events from a set of processed events carried out in connection with the process, wherein filtering the repetitive events comprises identifying multiple instances of the virtual process identifier associated with multiple instances of the same type of event, and reporting, to at least one server, the processed events remaining subsequent to the filtering step.

Illustrative embodiments can provide significant advantages relative to conventional process monitoring arrangements. For example, challenges associated with repetitive process event submissions are overcome through the implementation of VPIDs based on particular process-specific information. Such VPIDs can reduce the amount of data sent to servers in connection with security components and/or EDR solutions, providing substantial efficiency and performance advantages for such applications.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
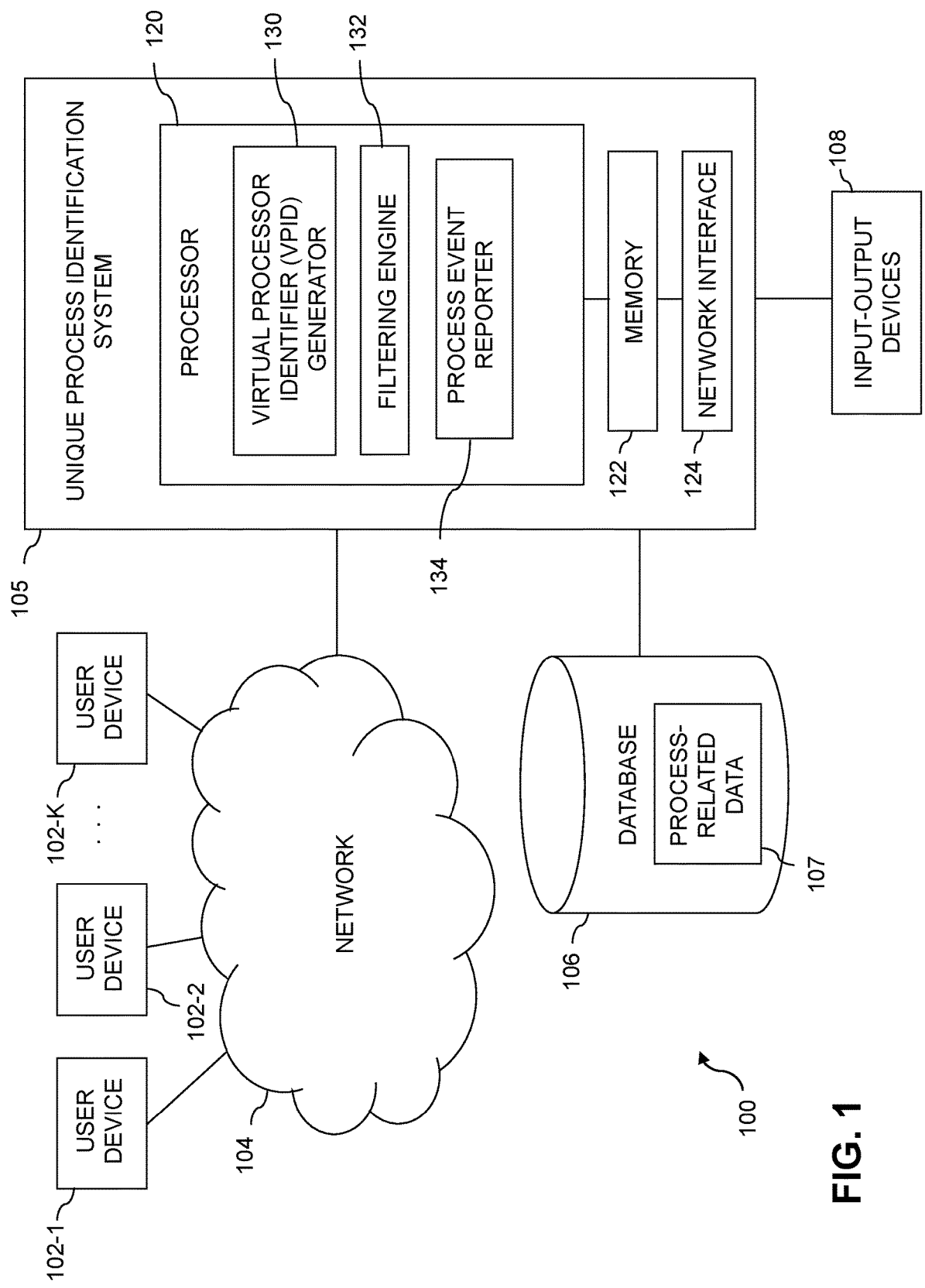
FIG. 1 shows an information processing system configured for generating unique virtual process identifiers in an illustrative embodiment of the invention.

FIG. 1 shows a computer network (also referred to herein as an information processing system) 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a unique process identification system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The unique process identification system 105 has an associated database 106 configured to store process-related data 107 illustratively comprising process file information, process file path information, command line argument information, user account information, parent chain information, etc.

The database 106 in the present embodiment is implemented using one or more storage systems associated with the unique process identification system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the unique process identification system 105 are input-output devices 108, which illustratively comprise keyboards, displays or other types of input-output devices in any combination. Such input-output devices are used to support one or more user interfaces to the unique process identification system 105, as well as to support communication between the unique process identification system 105 and other related systems and devices not explicitly shown.

The unique process identification system 105 in the FIG. 1 embodiment is assumed to be implemented using at least one processing device. Each such processing device generally comprises at least one processor and an associated memory, and implements one or more functional modules for controlling certain features of the unique process identification system 105.

More particularly, the unique process identification system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the unique process identification system 105 to communicate over the network 104 with the user devices 102, and illustratively comprises one or more conventional transceivers.

The processor 120 further comprises a VPID generator 130, a filtering engine 132, and a process event reporter 134.

It is to be appreciated that this particular arrangement of modules 130, 132, and 134 illustrated in the processor 120 of the FIG. 1 embodiment is presented by way of example only, and alternative arrangements can be used in other embodiments. For example, the functionality associated with the modules 130, 132, and 134 in other embodiments can be combined into a single module, or separated across a larger number of modules. As another example, multiple distinct processors can be used to implement different ones of the modules 130, 132, and 134 or portions thereof.

At least portions of the VPID generator 130, filtering engine 132, and process event reporter 134 may be implemented at least in part in the form of software that is stored in memory 122 and executed by processor 120.

It is to be understood that the particular set of elements shown in FIG. 1 for implementing unique virtual process identifiers involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the unique process identification system 105 can be eliminated and associated elements such as VPID generator 130, filtering engine 132, and process event reporter 134 can be implemented elsewhere in the computer network 100.

An exemplary process utilizing VPID generator 130, filtering engine 132, and process event reporter 134 of the unique process identification system 105 in computer network 100 will be described in more detail with reference to the flow diagram of FIG. 4.

In accordance with one or more embodiments of the invention, a given level of uniqueness is to be maintained in the reporting of process events, while at the same time ensuring that all events needed for an investigation are present in the system for viewing and querying by an analyst. An operating system generally maintains uniqueness of a process instance based on a process identifier (PID). In one or more embodiments of the invention, an end-point agent can implement its own unique identifier (VPID) for a process, which the agent can use to filter out similar and/or repeated instances of events and report the resulting and/or unique events.

For a given process, such an embodiment can include incorporating multiple types of information in generating a VPID. For example, such information can include a process file SHA256, which can indicate that if the hash of the underlying file is different (from a comparison process/event), then the process file is a different variant. Further, such information can include a full file path of a process, which can be used to manipulate process behavior. For instance, a malicious process that makes multiple copies of itself on a disk, may perform certain actions only if running from a particular folder (for example, if malware.exe is running from s user directory, it can be dormant; but if malware.exe is running from a temporary directory, it will start to beacon to its command and control server.

Additionally, such information to be incorporated can also include command line arguments (CmdArgs) For instance, a process might perform a certain action only when the process is launched with a specific parameter (for example, malware.exe may write a file only when launched with -w, and might only do a network connection when launched with -n). As used above, "-w" and "-n" refer to examples of command line arguments which can alter the functioning of a process. Such information can also include user account information. For instance, the same process running under different user accounts can exhibit different behaviors based on the privileges each user account possesses. Further, such information can additionally include parent chain information. Accordingly, one or more embodiments of the invention can include taking into consideration and/or processing the entire chain leading up to the parent process which created a given process. For example, a malicious process based on command and control server instructions can open a reverse shell on the system for the attacker to execute commands. Such a shell might also be used commonly by users and legitimate applications in day-to-day operations to execute various commands. As such, a need exists for a way to distinguish and highlight the commands specifically executed by the attacker (versus those executed by legitimate users and applications).

As further detailed herein, at least one embodiment of the invention can include generating and/or deriving a key (that is, a VPID), for a given process, based at least in part on the above-described types of information. Such a key (VPID) can be used to filter out duplicate events and also uniquely identify the entire process event chain. By way of example, in one or more embodiments of the invention, a unique VPID of a process can be calculated using following formula: VPID of Process(P)=Hash(VPID(Parent Process)+Filepath(P)+CmdArgs(P)+UserAccount(P)+SHA256(P)).

Figure 2:
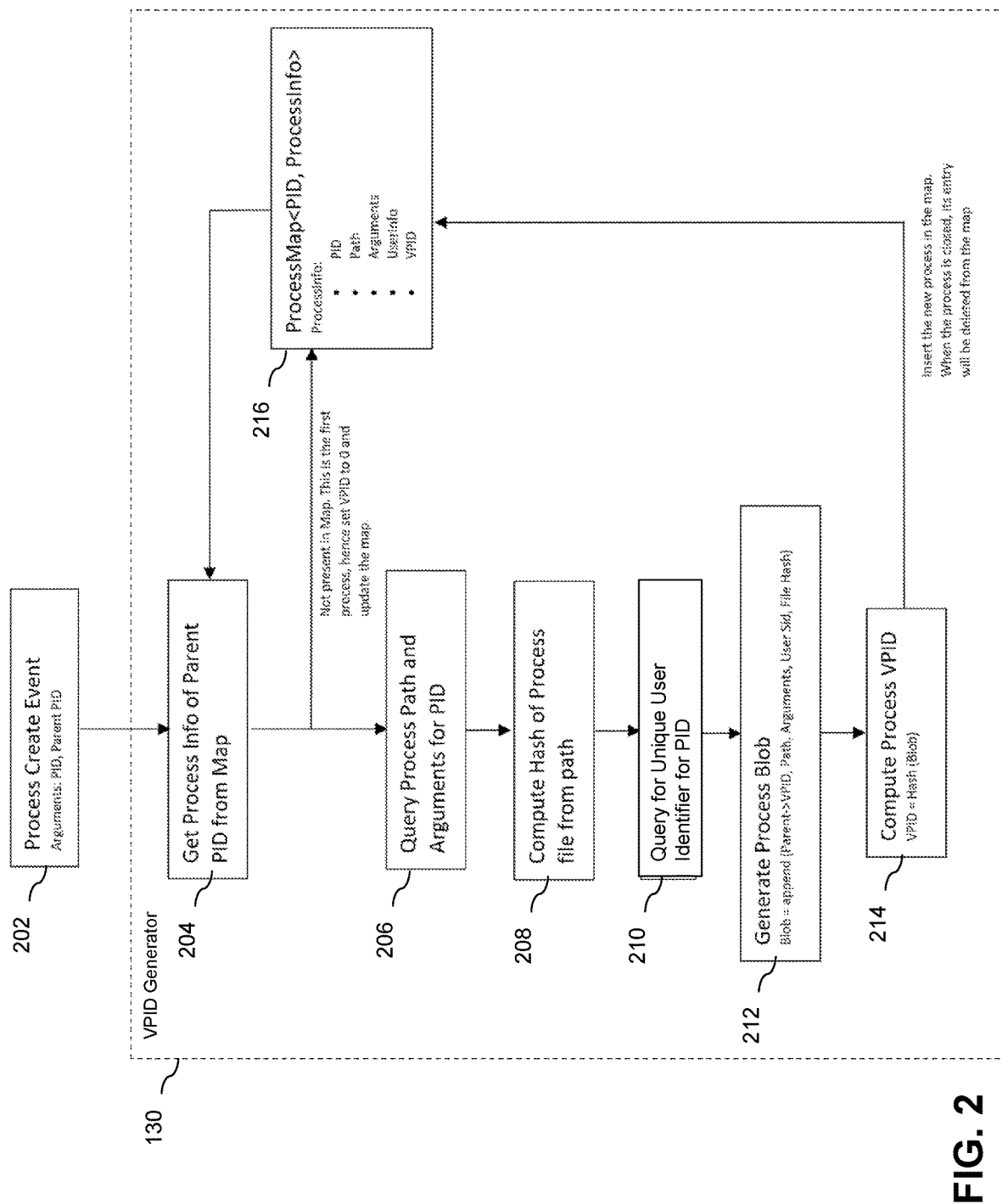
FIG. 2 shows an example work flow for computing a VPID of a process in an illustrative embodiment of the invention.

FIG. 2 shows an example work flow for computing a VPID of a process in an illustrative embodiment of the invention. As depicted in FIG. 2, the calculation of a VPID can be carried out (via VPID generator 130) during and/or in conjunction with a process create operation 202. Specifically, step 204 includes obtaining process information of a parent PID from a map 216 associated with the process (also referred to herein as a ProcessMap). In one or more embodiments of the invention, map 216 can be created to hold the VPID along with other process information for a given PID. For example, a map such as map 216 can, by way of example, be illustrated as follows; ProcessMap<PID, ProcessInfo (VPID, Path, User, Launch arguments . . . )>.

Referring again to step 204, if no process information of a parent PID can be identified and/or obtained from the map 216, then the process can be deemed the first process, and the VPID can be set to zero and the map 216 can be updated accordingly. Alternatively, if process information of a parent PID can be identified and/or obtained from the map 216, then step 206 includes querying for the process path and arguments for the PID, and step 208 includes computing a hash of the process file derived from the process path.

Additionally, step 210 includes querying for the unique user identifier for the PID. Step 212 includes generating a process blob (that is, binary data made by appending portions of noted data) by appending parent VPID, the process path, one or more command line arguments, the unique user identifier, and the file hash. Further, step 214 includes computing the process VPID by generating a hash of the process blob. As also noted in FIG. 2, the new process (and VPID) can be inserted into the map 216, and when the process is closed, its entry can be deleted from the map 216.

Figure 3:
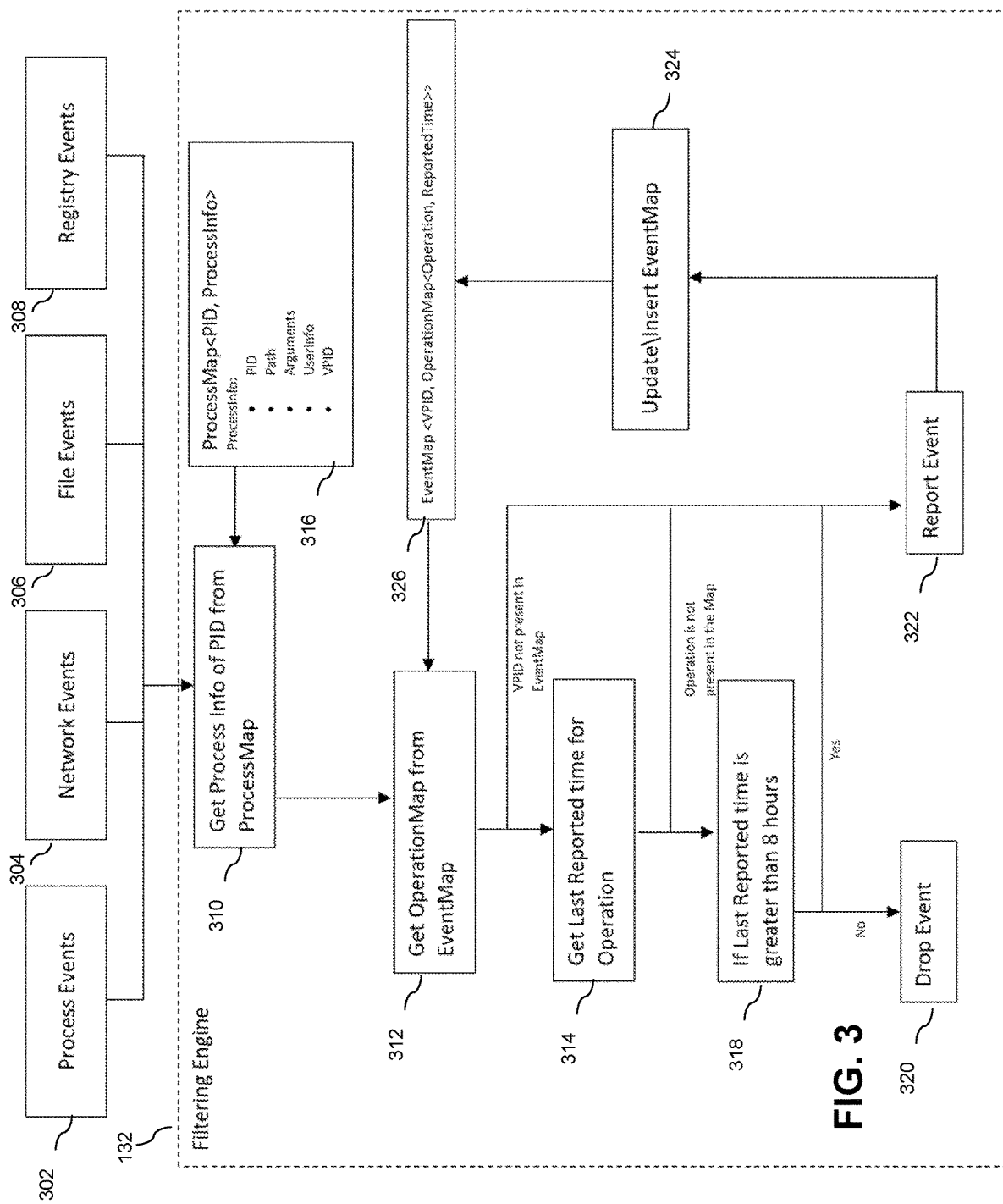
FIG. 3 shows an example work flow for filtering duplicate events in an illustrative embodiment of the invention.

FIG. 3 shows an example work flow for filtering duplicate events in an illustrative embodiment of the invention. By way of illustration, FIG. 3 depicts filtering engine 132, upon receiving various events such as process events 302, network events 304, file events 306, and registry events 308, carrying out a process to filter out duplicate and/or repeated events prior to reporting to a server and/or analyst. In accordance with one or more embodiments of the invention, once a ProcessMap 316 is created (such as described above in connection with FIG. 2 with the creation of map 216), any event (302, 304, 306, 308, etc.) carried out by a particular process will include the VPID instead of and/or in addition to the PID reported by the OS. Accordingly, the VPID will be used by the filtering engine 132, as detailed below and illustrated in FIG. 3, to report only unique events carried out by a process chain and to suppress repetitive events, which will help the backend system to scale while still providing all necessary data to the analyst for any relevant and/or related investigations.

Referring again to FIG. 3, step 310 includes obtaining process information associated with the PID from process map 316. In one or more embodiments of the invention, file, network, registry, and/or process events are obtained from operating system callbacks, and the operating system also provides the PID value of the process doing the operation. Such an embodiment can then include retrieving the ProcessInfo from a process map, which will then provide the VPID for the PID among other details of the process which were cached during the process launch. Step 312 includes obtaining an operation map from an event map 326. As noted herein, in accordance with one or more embodiments of the invention, there is an event map which includes a VPID as the key and an operation map as the value. For each of the different types of events (process, file, network, etc.), there are specific operations such as create process, open process, network connect, network accept, write to file, rename file, etc. In the operation map, the type of operation will be the key and the target will be the value. When an event happens for a VPID, at least one embodiment of the invention can include obtaining the event's operation map to determine if that operation has been reported for that target within the specified time window. If it has been reported within the time window, it is a repetitive event; otherwise, the event is unique and will be reported to the server, and the operation map will be updated with the target information for that operation.

Referring again to FIG. 3, step 314 includes determining and/or obtaining the last reported time for a particular operation (or operation type). If the operation is not present in the operation map, then the event is reported in step 322 and the event map is updated (or created anew) accordingly in step 324. If the operation is present in the operation map, and the last reported time for the operation (as determined in step 318) is beyond a pre-determined temporal threshold (for example, eight hours), then the event is similarly reported in step 322 and the event map is updated (or created anew) accordingly in step 324. Alternatively, if the operation is present in the operation map, and the last reported time for the operation is within the pre-determined temporal threshold (for example, eight hours), then the event is dropped and/or filtered out of the eventual reporting via step 320.

Figure 4:
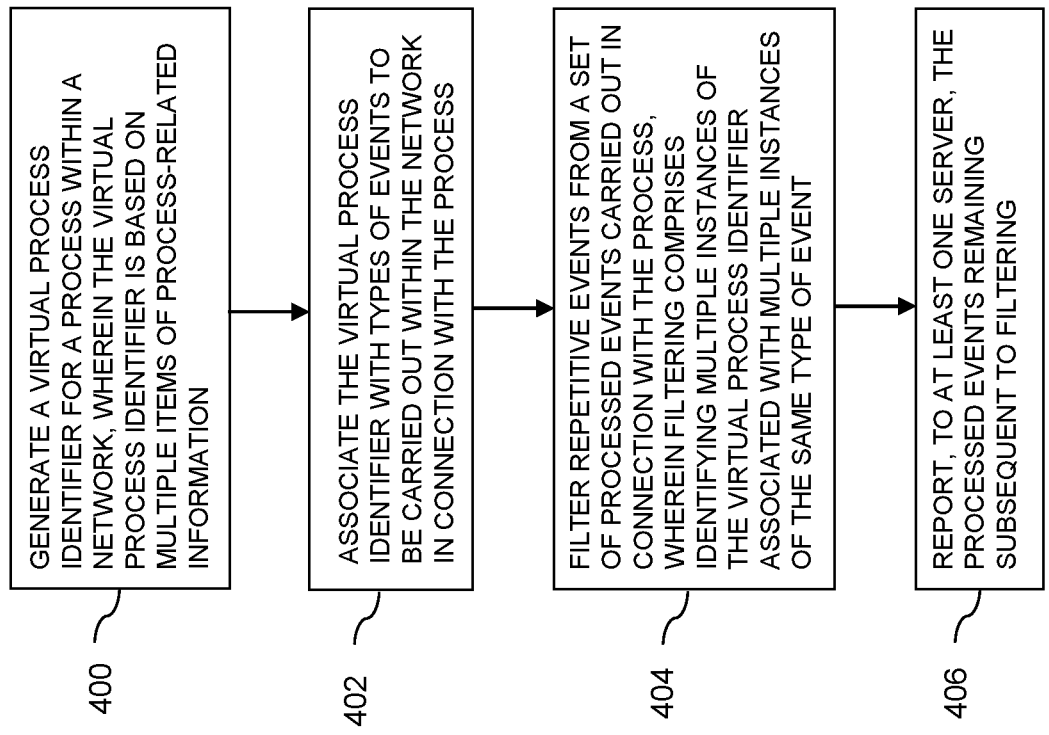
FIG. 4 is a flow diagram of a process for generating unique virtual process identifiers in an illustrative embodiment.

FIG. 4 is a flow diagram of a process for generating unique virtual process identifiers in an illustrative embodiment. It is to be understood that this particular process is only an example, and additional or alternative processes can be carried out in other embodiments. In this embodiment, the process includes steps 400 through 406. These steps are assumed to be performed by the processor 120 utilizing its modules 130, 132, and 134.

Step 400 includes generating a virtual process identifier for a process within a given network, wherein the virtual process identifier is based at least in part on multiple items of process-related information. The multiple items of process-related information can include a hash of an underlying file associated with the process, a full file path of the process, one or more command line arguments, user account information associated with the process, and/or a chain preceding a parent process which created the process. Additionally, generating the virtual process identifier can include generating the virtual process identifier for the computational process during a process creation operation.

Step 402 includes associating the virtual process identifier with one or more types of events to be carried out within the given network in connection with the process. Associating the virtual process identifier with one or more types of events can include creating a map to attribute the virtual process identifier to the multiple items of process-related information. Additionally, the one or more types of events can include file events, network events, registry events, and/or process events.

Step 404 includes filtering repetitive events from a set of processed events carried out in connection with the process, wherein filtering the repetitive events comprises identifying multiple instances of the virtual process identifier associated with multiple instances of the same type of event. Filtering the repetitive events can include implementing one or more temporal parameters related to reporting instances of processed events. Additionally, step 406 includes reporting, to at least one server, the processed events remaining subsequent to the filtering step. Additionally, in one or more embodiments of the invention, the event(s) reported to server will also have and/or include the VPID for the associated process(es).

At least one embodiment of the invention can also include performing one or more event sequence reconstruction operations based at least in part on the generated virtual process identifier. In such an embodiment, a VPID value is present in all events posted to the server by the agent. Accordingly, VPIDs can be used in reconstruction operations and/or efforts. For example, the two different chains below can be represented and distinguished via the VPID mechanism implemented in accordance with one or more embodiments of the invention, and such an implementation can help clarify a given sequence of events:
Explorer.exe→cmd.exe→ping xx.xx.xx.xx //(Genuine use case);
Explorer.exe→malware.exe→cmd.exe→ping yy.yy.yy.yy //(Malicious activity).

In connection with such an example sequence of events, assume the below events are posted in the server by an agent, wherein the value in the bracket is the VPID of the process. Genuine use case: (1) Explorer.exe (x1) create process cmd.exe (y1); (2) Cmd.exe(y1) create process ping (z1). Malicious use case: (1) Explorer.exe (x1) create process malware.exe (y2); (2) malware.exe (y2) create process cmd (yy); (3) cmd(yy) create process ping(z2).

Now when the events for Explorer.exe (x1) are retrieved, one or more embodiments of the invention can include querying the create process events and identify the two different chains, as noted above.

Additionally, the particular processing operations and other functionality described in conjunction with the flow diagram of FIG. 4 are presented by way of illustrative example only, and should not be construed as limiting the scope of the invention in any way. For example, the ordering of the process steps may be varied in other embodiments, or certain steps may be performed concurrently with one another rather than serially.

The above-described illustrative embodiments provide significant advantages relative to conventional approaches.

For example, some embodiments are configured to provide the implementation of unique process identifiers (referred to herein as VPIDs) based on particular process-specific information. These and other embodiments can effectively reduce the amount of data sent to servers in connection with security components and/or EDR solutions, providing efficiency and performance advantages for such applications.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
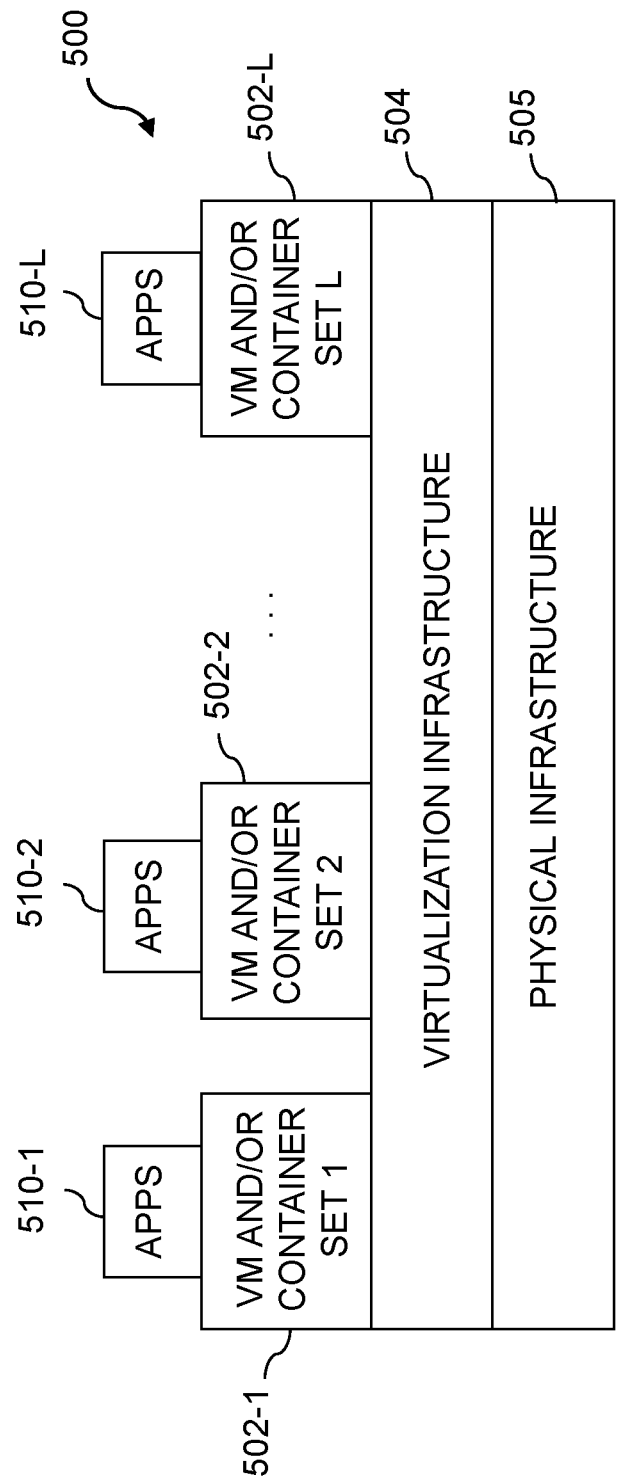
FIGS. 5 and 6 show examples of processing platforms that may be utilized to implement at least a portion of an information processing system in illustrative embodiments.
Figure 6:
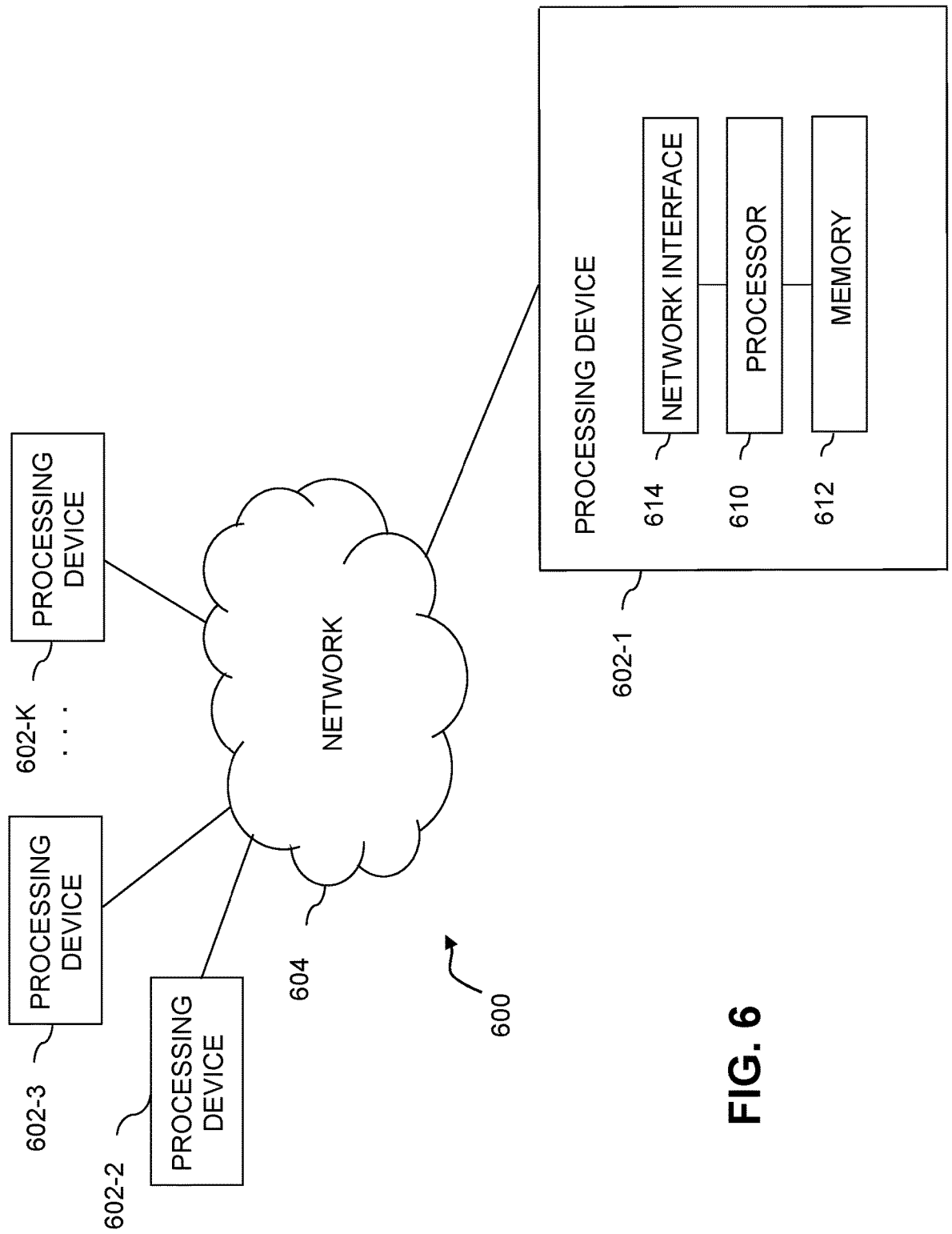

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide deduplication estimate generation functionality of the type described above for one or more processes running on a given one of the VMs. For example, each of the VMs can implement deduplication control logic and associated deduplication estimate tables for providing deduplication estimate generation functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide deduplication estimate generation functionality of the type described above for one or more processes running on different ones of the containers. For example, a container host device supporting multiple containers of one or more container sets can implement one or more instances of deduplication control logic and associated deduplication estimate tables for use in generating deduplication estimates.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide accurate and improved risk detection within a network. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:
   generating a virtual process identifier for a process within a given network, wherein the virtual process identifier is based at least in part on multiple items of process-related information, and wherein the multiple items of process-related information comprise a full file path of the process indicating at least one directory from which the process runs, a hash of an underlying file of the process, one or more command line arguments of the process, user account information associated with the user account running the process, and information identifying a chain of instructions preceding a parent process which created the process;
   associating the virtual process identifier with one or more types of events to be carried out within the given network in connection with the process, wherein associating the virtual process identifier with one or more types of events comprises creating a map to attribute the virtual process identifier to at least a portion of the multiple items of process-related information;
   filtering repetitive events from a set of processed events carried out in connection with the process, wherein filtering the repetitive events comprises identifying multiple instances of the virtual process identifier associated with multiple instances of the same type of event; and
   reporting, to at least one server, the processed events remaining subsequent to the filtering step;
   wherein the method is performed by at least one processing device comprising a processor coupled to a memory.

2. The computer-implemented method of claim 1, further comprising:
   performing one or more event sequence reconstruction operations based at least in part on the generated virtual process identifier.

3. The computer-implemented method of claim 1, wherein generating the virtual process identifier comprises generating the virtual process identifier for the computational process during a process creation operation.

4. The computer-implemented method of claim 1, wherein the one or more types of events comprises file events.

5. The computer-implemented method of claim 1, wherein the one or more types of events comprises network events.

6. The computer-implemented method of claim 1, wherein the one or more types of events comprises registry events.

7. The computer-implemented method of claim 1, wherein the one or more types of events comprises process events.

8. The computer-implemented method of claim 1, wherein filtering the repetitive events comprises implementing one or more temporal parameters related to reporting instances of processed events.

9. A non-transitory processor-readable storage medium having stored therein program code of one or more software programs, wherein the program code when executed by at least one processing device causes said at least one processing device:
   to generate a virtual process identifier for a process within a given network, wherein the virtual process identifier is based at least in part on multiple items of process-related information, and wherein the multiple items of process-related information comprise a full file path of the process indicating at least one directory from which the process runs, a hash of an underlying file of the process, one or more command line arguments of the process, user account information associated with the user account running the process, and information identifying a chain of instructions preceding a parent process which created the process;
   to associate the virtual process identifier with one or more types of events to be carried out within the given network in connection with the process, wherein associating the virtual process identifier with one or more types of events comprises creating a map to attribute the virtual process identifier to at least a portion of the multiple items of process-related information;

to filter repetitive events from a set of processed events carried out in connection with the process, wherein filtering the repetitive events comprises identifying multiple instances of the virtual process identifier associated with multiple instances of the same type of event; and to report, to at least one server, the processed events remaining subsequent to the filtering step.

10. The non-transitory processor-readable storage medium of claim 9, wherein filtering the repetitive events comprises implementing one or more temporal parameters related to reporting instances of processed events.

11. The non-transitory processor-readable storage medium of claim 9, wherein the program code when executed by said at least one processing device causes said at least one processing device:

to perform one or more event sequence reconstruction operations based at least in part on the generated virtual process identifier.

12. The non-transitory processor-readable storage medium of claim 9, wherein generating the virtual process identifier comprises generating the virtual process identifier for the computational process during a process creation operation.

13. The non-transitory processor-readable storage medium of claim 9, wherein filtering the repetitive events comprises implementing one or more temporal parameters related to reporting instances of processed events.

14. The non-transitory processor-readable storage medium of claim 9, wherein the one or more types of events comprises at least one of file events, network events, registry events, and process events.

15. An apparatus comprising:

at least one processing device comprising a processor coupled to a memory;

said at least one processing device being configured:

to generate a virtual process identifier for a process within a given network, wherein the virtual process identifier is based at least in part on multiple items of process-related information, and wherein the multiple items of process-related information comprise a full file path of the process indicating at least one directory from which the process runs, a hash of an underlying file of the process, one or more command line arguments of the process, user account information associated with the user account running the process, and information identifying a chain of instructions preceding a parent process which created the process;

to associate the virtual process identifier with one or more types of events to be carried out within the given network in connection with the process, wherein associating the virtual process identifier with one or more types of events comprises creating a map to attribute the virtual process identifier to at least a portion of the multiple items of process-related information;

to filter repetitive events from a set of processed events carried out in connection with the process, wherein filtering the repetitive events comprises identifying multiple instances of the virtual process identifier associated with multiple instances of the same type of event; and to report, to at least one server, the processed events remaining subsequent to the filtering step.

16. The apparatus of claim 15, wherein filtering the repetitive events comprises implementing one or more temporal parameters related to reporting instances of processed events.

17. The apparatus of claim 15, said at least one processing device being further configured:

to perform one or more event sequence reconstruction operations based at least in part on the generated virtual process identifier.

18. The apparatus of claim 15, wherein the one or more types of events comprises at least one of file events, network events, registry events, and process events.

19. The apparatus of claim 15, wherein generating the virtual process identifier comprises generating the virtual process identifier for the computational process during a process creation operation.

20. The apparatus of claim 15, wherein filtering the repetitive events comprises implementing one or more temporal parameters related to reporting instances of processed events.

* * * * *